Patented July 26, 1949

2,476,987

UNITED STATES PATENT OFFICE 2,476,987

5-ACYLOXY PYRAZOLES AND METHOD FOR MAKING SAME

Elmore Louis Martin, Wilmington, Del., assignor to E. I. du Pont de Nemours & Company, Wilmington, Del., a corporation of Delaware No Drawing. Application May 3, 1946, Serial No. 667,125

11 Claims. (Cl. 260—310)

This invention relates to amidoaldehydes containing a 5-acyloxypyrazole nucleus and to acetals thereof with alkanols of 1 to 4 carbon atoms and 1,2- and 1,3-dihydroxyalkanes of 2 to 4 carbon atoms and to their preparation.

An object of this invention is to provide a new class of pyrazole compounds. Another object is to provide a class of pyrazole derivatives which are useful as dye intermediates. A related object is to provide such derivatives which are useful as color formers. A further object is to provide 5-acyloxypyrazoles with aldehyde groups which can be reacted with vinyl alcohol polymers to form acetals without side reactions. A related object is to provide 5-acyloxypyrazoles with lower acetal groups which can be reacted with vinyl alcohol polymers to form acetals thereof, without side reactions. A further object is to provide a new class of magenta color formers. Still other objects will be apparent from the following description of the invention.

The above objects are accomplished with the preparation of a novel class of 5-acyloxypyrazoles which contain an aldehyde group or a corresponding acetal group in at least one of the 1 and 3 positions of the pyrazole ring. These compounds can be made by reacting a 5-acyloxypyrazole containing a reactive group in at least one of the 1 and 3 positions with an acetal of an aldehyde containing a group of opposite function and, if desired, converting the acetal group to the free aldehyde. For example, a 5-acyloxypyrazole containing an acid halide, and especially an acid chloride, group in at least one of the 1 and 3 positions is reacted with an acetal of an aminoaldehyde under amidating conditions, e. g., in the presence of an acid binding agent, such as an organic base. The 5-acyloxypyrazole acid halides should be free from acid halide-reactive groups, e. g., reactive methylene groups, amino groups, thiol groups, etc.

The reaction between the 5-acyloxypyrazole containing at least one acid halide group and the acetal of the aminoaldehyde is preferably carried out at a temperature from —10° to 30° C. in the presence of a solvent or diluent medium which permits more intimate contact between the reactants. Suitable solvents for carrying out the amidation reaction include dioxane, acetone, methanol, ethanol, ethylene glycol diethyl ether, and mixtures of such solvents with water. The reactants may be in solution or suspension in the medium. A practical manner of carrying out the reaction consists in gradually adding a solution of the acid halide in a water-miscible solvent to an aqueous suspension of an aminoaldehyde or acetal in the presence of an alkali metal carbonate solution at a temperature from —5° to 5° C.

The acetals of the lower aliphatic alcohols, i. e., alcohols containing 1 to 4 carbon atoms, are preferred. Included in this class are acetals of aliphatic monohydric alcohols and dihydric alcohols in which the two hydroxyl groups are in the 1,2- and 1,3-positions. Of these, because of their stability, ease of obtaining in crystalline form, and economy, I prefer the ethylene glycol acetals.

The 5-acyloxypyrazole amidoaldehydes and acetals which can be made from the 5-acyloxypyrazoles which contain an acid halide group in at least one of the positions 1 and 3 of the pyrazole ring are represented by the general formula:

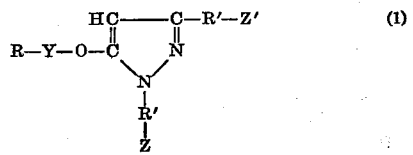

wherein Y is a member taken from the group consisting of carbonyl (—CO—) and sulfonyl (—SO$_2$—) radicals; R—Y— is an acyl radical; R' is a divalent organic radical linked by "hydrocarbon" carbon atoms (viz. having hydrogen or hydrocarbon groups attached thereto) to the cyclic carbon or nitrogen atom and to Z and Z' as shown; and Z and Z' are members taken from the group consisting of hydrogen, amidoaldehyde, and amidoacetal groups. However, one of the groups Z and Z' must contain an amidoaldehyde or acetal group. R' in Formula 1 is a divalent aliphatic, aromatic, or heterocyclic nucleus but may consist of two such nuclei joined by a bivalent bridging radical, e. g., —O—, —S—, —CO—, —SO$_2$—, —SO$_2$NH—, and —CONH—.

The compounds just described fall within two general classes of amidoaldehydes and their acetals with monohydric alcohols of 1 to 4 carbon atoms and 1,2- and 1,3-dihydric alcohols of 2 to 4 carbon atoms. In one case the amido acetal or aldehyde group is in the 1-position in the pyrazole nucleus and in the other it is in the 3-position. The amidoaldehydes are represented by the following two formulae:

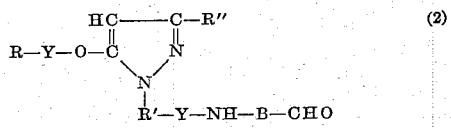

and

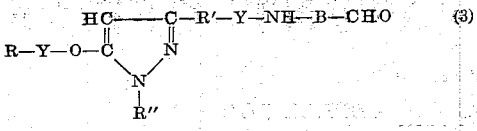

wherein Y, R, and R' have the same significance as in Formula 1, R'' is a monovalent hydrocarbon nucleus, and B has the same significance as R' but need not be identical.

The preferred compounds may be represented by the formula:

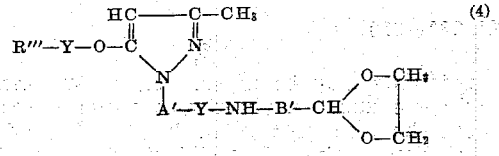

wherein Y is a carbonyl or sulfonyl radical; A' is a divalent hydrocarbon nucleus which is attached to the 1-nitrogen atom through an aromatic hydrocarbon radical; B' is a phenylene radical; and R''' is a member of the group consisting of alkyl of 1 to 3 carbon atoms, alkoxy radicals of 1 to 2 carbon atoms, phenyl, methylphenyl, and ethylphenyl. These compounds are preferred because the reactant materials are commercially available and, what is more important, the resulting azomethine dyes have superior color characteristics for color photography. The compounds where R''' is alkoxy are preferred because of their resistance to hydrolysis and ease of obtaining the compounds in crystalline form.

The hydrocarbon nuclei in Formulae 1, 2, and 3 may be unsubstituted or contain various substituents which are common in color formers and do not enter into dye coupling reactions, e. g., methoxy, alkyl, aryl, halogen, and nitro groups but should be free from aldehyde reactive groups as above described.

A convenient and practical method for the preparation of the acid halides of 5-acyloxypyrazoles described above consists in reacting a 5-pyrazolone containing a carboxylic or sulfonic acid group in the 1- and/or 3-position with an organic carboxylic or sulfonic acid chloride or bromide free from ketaldone reactive groups in an aqueous alkaline solution, isolating the resulting 5-acyloxypyrazole either as the pure acid or as an alkali metal salt and converting the acid group to an acid halide group. It is generally desirable to use at least one mol of alkali, e. g., alkali metal hydroxide, per acid group and at least one mol of organic acid halide and, preferably, a slight excess, e. g., 1.2 mols, per mol of 5-pyrazolone. From 1.0 to 2.5 mols of alkaline compound per acid group represents a practical range. The acylation reaction is preferably carried out at temperatures from −5° to 30° C. and for a length of time sufficient to permit complete utilization of the acid halide. When the acid group is a sulfonic acid, the reaction product is best insolated as the potassium or sodium salt of the sulfonic acid. This is accomplished by "salting out," i. e., the addition of potassium chloride or sodium chloride. When the acid group is a carboxylic acid, the reaction product may be isolated by the addition of a mineral acid, for example, hydrochloric acid, sulfuric acid, or by the addition of an organic acid, for example, formic acid, acetic acid. In either case the reaction product is purified by crystallization.

The preparation of these reactants is more fully described in application Serial No. 657,629 filed March 27, 1946.

When the 5-acyloxypyrazoles containing an acid halide group in the 1- or 3-position are reacted with amino acetals as described above, the resulting amido acetals can be converted to the corresponding aldehydes by hydrolysis of the acetal group. This may be done by means of an aqueous solution of a mineral acid such as dilute hydrochloric, sulfuric, or phosphoric acid at room temperature. However, the lower acetals are useful for many purposes and can be used for the preparation of higher acetals, e. g., acetals of polyvinyl alcohol, with results similar to the free aldehydes.

The invention will be further illustrated by the following examples. The parts are by weight.

EXAMPLE I

*m-[p-(5-ethylcarbonato-3-methyl-1-pyrazolyl)-benzamido]benzaldehyde ethylene glycol acetal*

A solution of 92.5 parts of 1-(4'-chloroformylphenyl)-3-methyl-5-pyrazolyl ethyl carbonate prepared as described in Example I of copending application Serial No. 657,629 filed March 27, 1946, in 150 parts of anhydrous dioxane is added dropwise during 15 minutes to a vigorously stirred suspension of 60 parts of m-aminobenzaldehyde ethylene glycol acetal, 45 parts of anhydrous potassium carbonate, 375 parts of water, and 150 parts of dioxane. The temperature of the reaction mixture is maintained at 0°–3° C. by external cooling. In about 15 minutes, after the addition of the acid chloride is completed, crystals of the amidoacetal begin to separate. The mixture is stirred for an additional period of one hour, the temperature being maintained at 3° C. The nearly colorless microscopic crystals are collected, washed thoroughly with water, and air dried. The yield of the compound which melts at 118°–120° C. is 124 parts. It has the above-entitled name and the probable formula:

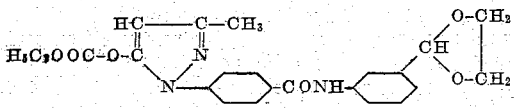

For purification the compound is dissolved in 450 parts of benzene, the solution treated with decolorizing charcoal and after the filtrate has been concentrated to about one-half its original volume and is allowed to cool, 112 parts of colorless crystals melting at 120°–122° C. are obtained. Analysis, calculated for $C_{23}H_{28}O_6N_3$: C=63.13; H=5.30; N=9.61. Found: C=63.33, 63.38; H=5.60, 5.77; N=9.95.

The compound of the preceding paragraph can be converted to m-[p-(5-ethylcarbonato-3-methyl-1-pyrazolyl)benzamido]benzaldehyde by the following method: To a solution of 50 parts of m[p-5-ethylcarbonato-3-methyl-1-pyrazolyl)-benzamido]benzaldehyde ethylene glycol acetal in 160 parts of acetone at 30° C. is added in one portion 100 parts of 10% hydrochloric acid. The solutions are mixed thoroughly and stirred for about one minute during which time nearly colorless crystals of the aldehyde separate. The mixture is stirred occasionally for a period of about four minutes, then is cooled to 20° C. and an additional quantity of 50 parts of 10% hydrochloric acid is added. After mixing thoroughly a sufficient quantity of crushed ice is added directly to the reaction mass to bring its temperature to 0° C. The resulting crystalline product is collected, washed free of acid and is air dried. The yield of material melting at 134°–136° C. is quantitative. For purification the product is dissolved in 160 parts of acetone at 40° C., 70–100 parts of water are added and the solution is treated with decolorizing charcoal. The colorless filtrate is heated to 38° C. and a sufficient volume of water (70–100 parts) is added to induce crystallization. The mixture is allowed to stand undisturbed for several minutes at room temperature and then is cooled to 0° C. with occasional stirring. The colorless fine needles are collected and air dried. The yield of compound melting at 135°–136° C. is 42 parts. Analysis, calculated for $C_{21}H_{19}O_5N_3$: C=64.11; H=4.76; N=10.68. Found: C=64.55, 64.52; H=4.79, 4.89; N=10.59, 10.62.

EXAMPLE II

*m-[p-(5-benzoxy - 3 - methyl - 1 - pyrazolyl)benzenesulfonamido]benzaldehyde ethylene glycol acetal*

To a stirred suspension of 85 parts of m-aminobenzaldehyde ethylene glycol acetal, 130 parts of water, 40 parts of dioxane, and 69.5 parts of anhydrous potassium carbonate cooled to −5° C. by means of external cooling is added dropwise a solution of 189 parts of 1-(4'-chlorosulfophenyl))-3-methyl-5-pyrazolylbenzoate prepared by the procedure of Example II of application Serial No. 657,629 in 375 parts of dioxane heated to 80°–90° C. at such a rate that the internal temperature does not exceed 0° C. After the addition is complete, the stirring is continued at 0° C. for four hours, then at room temperature for four hours. The mixture is diluted with two liters of water which are added carefully and the yellow product is filtered and washed with water. The yield of air dried material is quantitative. Crystallization from benzene gives 200 parts of pure amido acetal melting at 96° C. Analysis, calculated for $C_{26}H_{23}O_6N_3S$: S=6.3; N=8.34. Found: S=5.6; N=8.41.

*m-[p-(5 - benzoxy-3-methyl - 1 - pyrazolyl)benzenesulfonamido]benzaldehyde*

To a solution of 250 parts of the above amido acetal of this example in 400 parts of acetone at room temperature is added 125 parts of 10% hydrochloric acid and the solution is stirred at room temperature for one hour. After standing overnight at 5° C., the mixture deposits fine light yellow crystals which are filtered and dried. The yield of crude amidoaldehyde melting at 159°–162° C. is 230 parts. Crystallization from acetone gives 200 parts of purified material melting at 164°–165° C. Analysis, calculated for $C_{24}H_{19}O_5N_3S$: C=62.5; H=4.1; N=9.11; S=6.95. Found: C=62.3; H=4.5; N=9.3; S=6.8.

EXAMPLE III

*m-[p -(5-benzoxy - 3 - methyl-1-pyrazolyl)phenoxyacetamido]benzaldehyde*

To a stirred suspension of 8.5 parts of m-aminobenzaldehyde ethylene glycol acetal, 20 parts of water, 10 parts of dioxane, and 7 parts of anhydrous potassium carbonate cooled to 0° C. is added dropwise to a solution of 18.6 parts of 1-(4'-chloroformylmethoxyphenyl)-3-methyl-5-pyrazolylbenzoate (prepared after the manner described in Example IV of application Serial No. 657,629) in 50 parts of dioxane at such a rate that the internal temperature does not exceed 0° C. Stirring is continued for two hours at 0° C. and for two hours at 25° C. After dilution of the reaction mixture with 400 parts of water, the oil is separated and dissolved in methylene chloride. Crystallization from benzene of the residue after removal of the methylene chloride gives a crystalline material melting at 115°–116° C. Hydrolysis of the amido acetal essentially as described in Example II gives the amidoaldehyde.

EXAMPLE IV

A suspension of 5 parts of 1-(4'-carboxyphenyl)-3-methyl-5-pyrazolone in 10 parts of acetic anhydride containing a trace of sodium acetate is heated gently until a homogeneous solution is obtained. The acetic acid and excess acetic anhydride are removed by distillation under reduced pressure on a steam bath. The resulting 1-(4'-carboxyphenyl)-3-methyl-5-pyrazolyl acetate is dissolved in ether and 3 parts of thionyl chloride are added. A vigorous reaction occurs and hydrogen chloride and sulfur dioxide are evolved. The mixture is refluxed gently for an additional period of 15 minutes during which time the evolution of gases ceases. The ether is removed by evaporation and the 1-(4'-chloroformylphenyl -3-methyl-5-pyrazolyl acetate is added to a suspension of 3 parts of m-aminobenzaldehyde dimethyl acetal in a solution of 3 parts of potassium carbonate in 30 parts of water cooled to 5° C. The mixture is shaken vigorously and after several minutes the reaction product is separated, washed free with water, and then with ether. The reaction product is dissolved in alcohol and an aqueous alkaline developer solution of p-aminodiethyl aniline is added. A piece of bleached black and white film is color developed in this solution of color former and developer. Removal of the metallic silver gives a strong magenta image.

EXAMPLE V

*m-[p-(5-benzoxy-3- methyl- 1 -pyrazolyl)benzamido]benzaldehyde*

To a stirred suspension of 17 parts of 1-(4'-chloroformylphenyl) - 3-methyl - 5-pyrazolylbenzoate (prepared by a procedure similar to that outlined in Example V of application Serial No. 657,629 except that benzoyl chloride was used as the acylating agent) dissolved in 50 parts of dioxane is added dropwise to a vigorously stirred mixture of seven parts of anhydrous potassium carbonate, 50 parts of water, 8.5 parts of m-aminobenzaldehyde ethylene glycol acetal, and 15 parts of dioxane cooled to 2°–4° C. by external cooling. After stirring for a period of three hours at this temperature, the crystalline product is collected and is washed with cold water. Crystallization from alcohol yields long thin needles melting at 164°–165° C. A solution of the amidoacetal in acetone is treated with 10% hydrochloric acid as described in Example I and the colorless needles are collected, washed with water, and crystallized from a mixture of acetone and alcohol. m-[p-5-benzoxy-3-methyl-1-pyrazolyl)benzamido]benzaldehyde melts at 174°–176° C. Analysis calculated for $C_{25}H_{19}O_4N_3$: C=70.57; H=4.51; N=9.88. Found: C=70.40; H=4.60, 4.45; N=9.32, 9.57.

EXAMPLE VI

*m-[p-(5-ethylcarbonato - 1-phenyl- 3-pyrazolyl) benzamido]benzaldehyde ethylene glycol acetal*

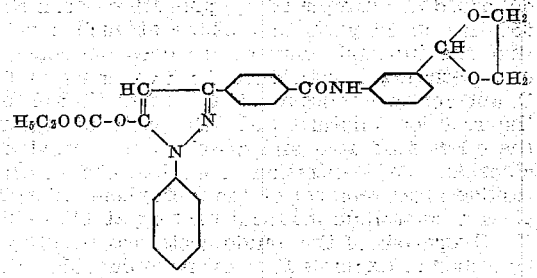

To a stirred suspension of 6 parts of m-aminobenzaldehyde ethylene glycol acetal, 25 parts of water, 25 parts of dioxane, and 6 parts of anhydrous potassium carbonate cooled to 0° C. was added dropwise a solution of 12.6 parts of 1-phenyl-3-(4'- chloroformylphenyl) - 5-pyrazolyl ethyl carbonate (prepared after the manner described in Example VI of application Serial No. 657,629) in 25 parts of anhydrous dioxane at such a rate that the internal temperature did not exceed 2° C. Stirring was continued for one hour at 0°–5° C. After dilution with water, the oil is separated and converted to the free aldehyde as described below.

*m-[p-(5-ethylcarbonato-1-phenyl - 3 -pyrazolyl) benzamido]benzaldehyde*

The crude acetal prepared as described above was dissolved in 100 parts of acetone, the solution was heated to 40° C. and 70 parts of 3 N hydrochloric acid was added with stirring. After a few minutes, the mixture was cooled to 0° C., by the addition of ice, the crystalline product was collected, washed free of acid and crystallized from benzene. The yield of colorless fine needles melting at 184°–185.5° C. was 16 parts. Analysis, calculated for $C_{26}H_{21}O_5N_3$: N=9.23. Found: 9.17; 9.42.

In place of the specific 5-acyloxypyrazoles containing an acid halide group in the 1- or 3-position described above, there may be used for amidation of the aminoaldehydes or aminoacetals other compounds of this type including those obtainable by the processes taught in application Serial No. 657,629. Among such useful additional acid chlorides are 1-(2'-chloroformylphenyl)-3-furyl - 5-pyrazolyl benzenesulfonate, 1-(4'-chlorosulfonaphthyl-1')-3-methyl-5-pyrazolyl ethyl carbonate, 1-(6'-cholorsulfonaphthyl-2')-3-phenyl-5-pyrazolyl acetate, and 1-(4'-chloroformylmethohyphenyl)-3-naphthyl-5-pyrazolyl chlorobenzoate, 1-phenyl-3-chloroformyl-5-pyrazolyl ethyl carbonate, 1-(2'-benzthiazolyl)-3-(p-chloroformylphenyl) - 5 - pyrazolylbenzoate, 1-(2'-methoxy - 5' - nitrophenyl) - 3 - (p-chloroformylphenyl)-5-pyrazolyl methyl carbonate, and 1-(3'-pyridyl)-3-chloroformylmethyl-5-pyrazolyl ethyl carbonate.

The corresponding acid bromides are also useful and their preparation is described in the aforesaid application.

In place of the specific amino compounds described in the examples, there may be substituted other aminoacetals including m-aminobenzaldehyde dimethyl acetal, p-aminobenzaldehyde ethylene glycol acetal, o-aminobenzaldehyde diethyl acetal, 1-amino-2,2-diethoxyethane, 1-amino-3,3-diethoxypropane, 1-(4'-aminophenoxy)-2,2-diethoxyethane, 1-(4'-aminophenyl)-2,2-dimethoxyethane, 2-chloro-4-amino-benzaldehyde dimethyl acetal, 4-methoxy-3-aminobenzaldehyde ethylene glycol acetal.

The acetals of aminoaldehydes are normally used because of their greater stability as opposed to the aminoaldehydes themselves. However, where the amino-aldehydes are sufficiently stable they may be used directly in the amidation reaction.

Although it is possible to prepare 5-acyloxypyrazoles containing more than one aldehyde (or acetal) group per molecule, the compounds which contain only one aldehyde or acetal group are preferred. Among the additional compounds obtainable in accordance with the invention are:

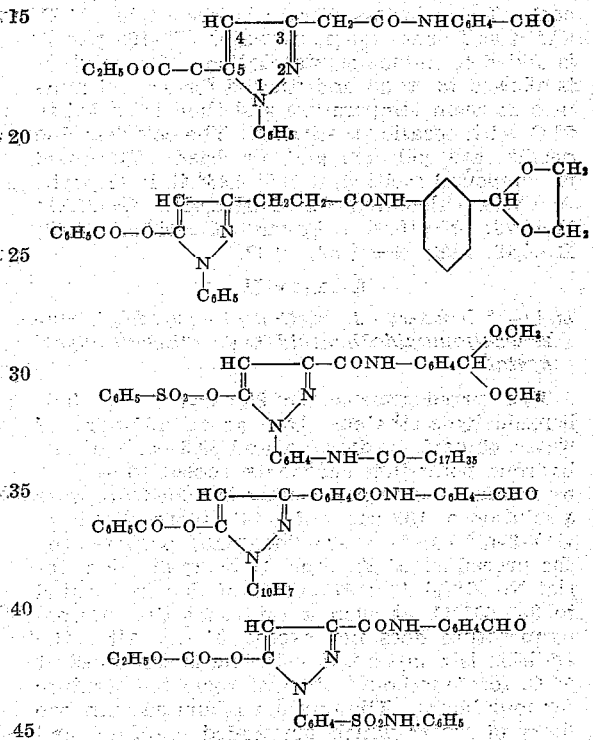

As indicated in the examples, an alkali metal carbonate is the preferred reagent for neutralization of the hydrogen chloride formed by the reaction of the acid chloride and the amine. Other reagents which will react with or neutralize hydrogen chloride include organic compounds which have a basic nitrogen atom containing no replaceable basic hydrogen atoms, such as pyridine, quinoline, dimethylaniline, trimethylamine, triethanolamine, etc.; alkali metal bicarbonates, such as sodium bicarbonate and potassium bicarbonate; alkali earth carbonates; and bicarbonates. Alkali metal salts of organic acids, such as sodium formate, potassium acetate, etc., may also be used.

Although the amidation may be carried out within a wide range of temperatures, it is practical to carry out the reaction in the temperature range of —10° to 40° C. At lower temperatures the reaction becomes unduly slow, whereas at higher temperatures side reactions such as hydrolysis of the acid halides before reaction with the amine and hydrolysis of the 5-acyloxypyrazole become appreciable, thereby decreasing the yield of the desired product.

The preferred ratio of reactants is one chemical equivalent of an acid halide of a 5-acyloxypyrazole, 1 to 1.1 chemical equivalents of an amine, and 1 to 1.5 chemical equivalents of a reagent capable of reacting with or neutralizing the hydrogen halide liberated during the reaction. It is also possible to carry out the reaction in media other than water-dioxane. Other water-organic solvent systems include water-acetone, water-alcohol, water-benzene, water-ether, etc.

The conversion of the amidoacetals to amidoaldehydes can be accomplished by any of the known methods for hydrolysis of acetals to aldehydes which involves treatment of an aqueous solution or suspension of an acetal with a mineral acid, such as hydrochloric acid, sulfuric acid, phosphoric acid, etc. or with other acids, e. g., p-toluenesulfonic acid. As indicated in the examples, the hydrolysis may be carried out rapidly at temperatures of about 40° C. or slowly at lower temperatures. In any case only a small amount of mineral acid is required. Higher reaction temperatures and hydrogen ion concentrations are to be avoided as they cause undesirable side reactions, such as splitting of the 5-acyloxypyrazoles.

Aldehydes and acetals containing a 5-acyloxypyrazole nucleus as defined in this application are important intermediates in the preparation of polyvinyl acetals. They are also useful in photographic emulsions as color formers and can serve as dye intermediates for the dyeing of cotton, wool, nylon, cellulose acetate, and other synthetic fibers and fabrics. They couple readily with the oxidation product of a para-phenylenediamine developer to give blue, red, or magenta dyes and with diazo compounds to give red or yellow dyes.

As many widely different embodiments of this invention can be made without departing from the spirit and scope thereof, it is to be understood that the invention is not to be limited except as defined by the claims.

What is claimed is:

1. Compounds taken from the group consisting of 5-acyloxypyrazoles which are unsubstituted in the 4-position and contain an amidoaldehyde group in at least one of the positions 1 and 3 in the pyrazole ring and their acetals with alkanols of 1 to 4 carbon atoms and 1,2- and 1,3-dihydroxyalkanes of 2 to 4 carbon atoms, and are free from amido-aldehyde reactive groups.

2. Compounds taken from the groups consisting of 5-acyloxypyrazoles which are unsubstituted in the 4-position and contain an amidoaldehyde group in one of the positions 1 and 3 in the pyrazole ring and their acetals with alkanols of 1 to 4 carbon atoms and 1,2- and 1,3-dihydroxyalkanes of 2 to 4 carbon atoms, and are free from amido-aldehyde reaction groups.

3. 5-acyloxypyrazoles which are unsubstituted in the 4-position and contain an amido-aldehyde group in at least one of the positions 1 and 3 in the pyrazole ring and are free from amido-aldehyde reactive groups.

4. 5-acyloxypyrazoles which are unsubstituted in the 4-position and contain an amido-aromatic aldehyde group in one of the positions 1 and 3 in the pyrazole ring and are free from amido-aldehyde reactive groups.

5. Compounds taken from the class consisting of amidoaldehydes of the formula:

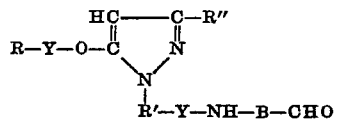

wherein Y is a member taken from the group consisting of carbonyl and sulfonyl radicals; R—Y— is an acyl radical; R' is a divalent organic radical linked by hydrocarbon carbon atoms to the cyclic nitrogen atom and Y; R" is a monovalent hydrocarbon nucleus and B is a divalent organic radical linked by hydrocarbon carbon atoms to NH and CHO, and their acetals with monohydric alcohols of 1 to 4 carbon atoms and dihydric alcohols of 2 to 4 carbon atoms.

6. Compounds taken from the class consisting of amidoaldehydes of the formula:

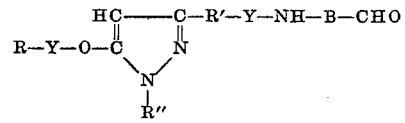

wherein Y is a member taken from the group consisting of carbonyl and sulfonyl radicals; R—Y— is an acyl radical; R' is a divalent organic radical linked by hydrocarbon carbon atoms to the cyclic nitrogen atoms and Y; R" is a monovalent hydrocarbon nucleus and B is a divalent organic radical linked by hydrocarbon carbon atoms to NH and CHO, and their acetals with monohydric alcohols of 1 to 4 carbon atoms and dihydric alcohols of 2 to 4 carbon atoms.

7. The 5-acyloxypyrazole amidoaldehyde acetals of the formula:

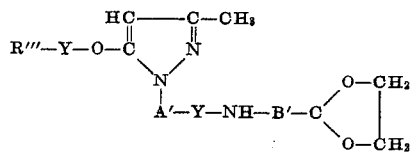

wherein Y is a member taken from the group consisting of carbonyl and sulfonyl radicals; R''' is an alkoxy radical of 1 to 2 carbon atoms; A' is a divalent hydrocarbon nucleus which is attached to the 1-nitrogen atom through an aromatic hydrocarbon radical and B' is a phenylene radical.

8. The process which comprises reacting a 5-acyloxypyrazole which is unsubstituted in the 4-position and is free from amido-aldehyde reactive groups and contains an acid halide radical taken from the group consisting of carboxylic and sulfonic acid halides in one of the positions 1 and 3 in the pyrazole ring with an acetal of an aminoaldehyde with an alcohol taken from the group consisting of monohydric aliphatic alcohols of 1 to 4 carbon atoms and dihydric aliphatic alcohols of 2 to 4 carbon atoms.

9. m-[p-(5 - ethylcarbonato - 3 - methyl-1-pyrazolyl) benzamido]benzaldehyde ethylene glycol acetal.

10. m-[p-(5-benzoxy - 3 - methyl-1-pyrazolyl)-benzenesulfonamido]benzaldehyde ethylene glycol acetal.

11. m-[p-(5 - ethylcarbonato - 1 - phenyl-3-pyrazolyl) benzamido]benzaldehyde ethylene glycol acetal.

ELMORE LOUIS MARTIN.

REFERENCES CITED

The following references are of record in the file of this patent:

UNITED STATES PATENTS

| Number | Name | Date |
|---|---|---|
| 2,320,422 | Frohlich | June 1, 1943 |

FOREIGN PATENTS

| Number | Country | Date |
|---|---|---|
| 27,485 | Great Britain | Mar. 12, 1907 |
| 547,064 | Great Britain | Aug. 12, 1942 |

Certificate of Correction

Patent No. 2,476,987                                          July 26, 1949

ELMORE LOUIS MARTIN

It is hereby certified that errors appear in the printed specification of the above numbered patent requiring correction as follows:

Column 6, line 33, Example IV, after "formylphenyl" insert a closing parenthesis; column 7, line 43, before "9.17" insert $N=$; line 56, for "roformylmethohyphenyl)" read *roformylmethoxyphenyl)*; column 8, line 17, in the formula, for "$C_2H_5OOC-C-C_5$" read $C_2H_5OOC-O-C_5$; column 9, line 46, for the word "groups" read *group*; line 53, for "reaction" read *reactive*; column 10, line 29, in the formula, for "$A'-Y-NH-B'-C$" read $A'-Y-NH-B'-CH$;

and that the said Letters Patent should be read with these corrections therein that the same may conform to the record of the case in the Patent Office.

Signed and sealed this 10th day of January, A. D. 1950.

[SEAL]

THOMAS F. MURPHY,
*Assistant Commissioner of Patents.*